(No Model.) 2 Sheets—Sheet 1.

L. H. HANSEN.
TOP BOX OR RACK ATTACHMENT FOR VEHICLES.

No. 523,523. Patented July 24, 1894.

WITNESSES:
William Goebel.
C. Sedgwick

INVENTOR
L. H. Hansen
BY
Munn & Co.
ATTORNEYS.

(No Model.) 2 Sheets—Sheet 2.
L. H. HANSEN.
TOP BOX OR RACK ATTACHMENT FOR VEHICLES.
No. 523,523. Patented July 24, 1894.
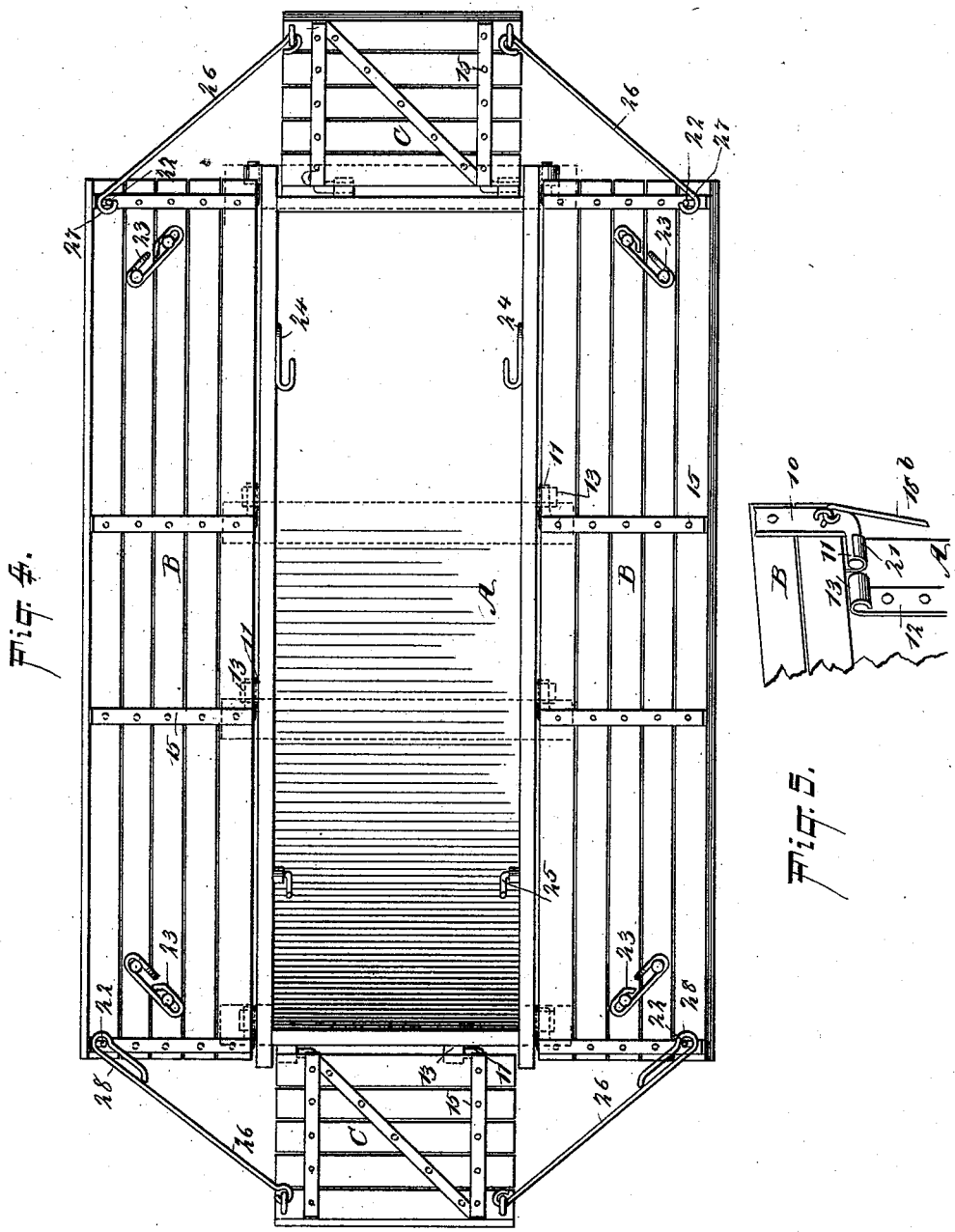
WITNESSES:
C. Sedgwick
Edgar Tate
INVENTOR
L. H. Hansen
BY
Munn & Co
ATTORNEYS.

UNITED STATES PATENT OFFICE.

LAWRENCE H. HANSEN, OF DANVILLE, SOUTH DAKOTA.

TOP BOX OR RACK ATTACHMENT FOR VEHICLES.

SPECIFICATION forming part of Letters Patent No. 523,523, dated July 24, 1894.

Application filed September 29, 1893. Serial No. 486,771. (No model.)

*To all whom it may concern:*

Be it known that I, LAWRENCE H. HANSEN, of Danville, in the county of Turner and State of South Dakota, have invented a new and Improved Top Box or Rack Attachment for Vehicles, of which the following is a full, clear, and exact description.

My invention relates to a top box or rack attachment for vehicles, especially farm wagons, and it has for its object to provide a means whereby an upper structure may be expeditiously and conveniently attached to the wagon body in such a manner that a close high body may be obtained, adapted for the carriage of cattle, corn, grain, or any description of like bulky articles, and also whereby the sides and ends of the body extension may be dropped downward at an angle to the body proper of the vehicle and maintained in that position, thereby converting the vehicle into a wagon especially adapted for hauling hay, or straw of any description, or similar articles.

Another object of the invention is to provide locking devices whereby the body extension may be held firmly in whatever position it may be placed, and whereby further the upper structure of the body will be held rigidly in either its expanded or its closely folded position.

The invention consists in the novel construction and combination of the several parts, as will be hereinafter fully set forth and pointed out in the claims.

Reference is to be had to the accompanying drawings, forming a part of this specification, in which similar figures and letters of reference indicate corresponding parts in all the views.

Figure 1:
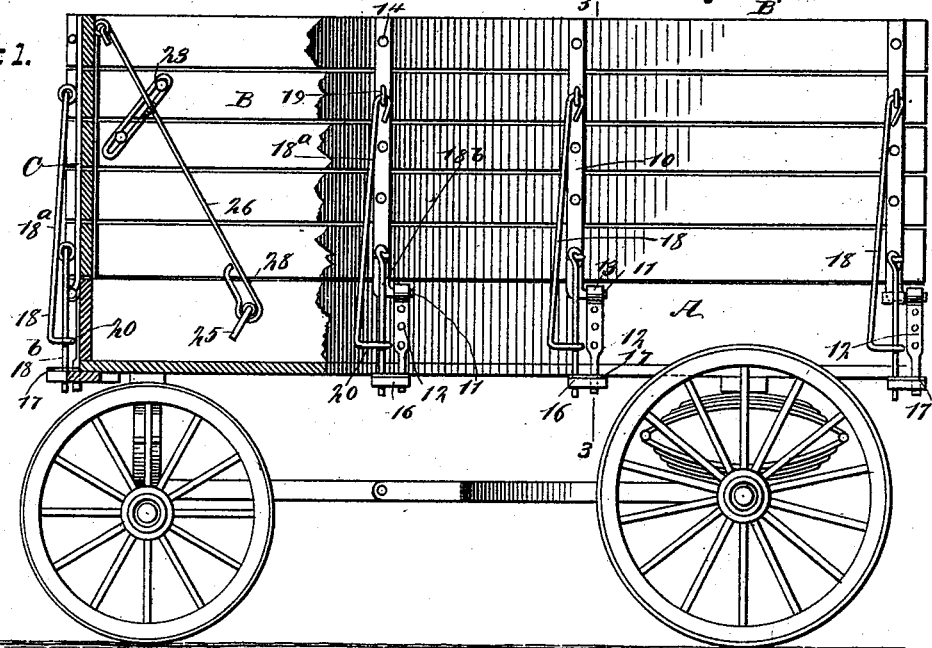
Figure 2:
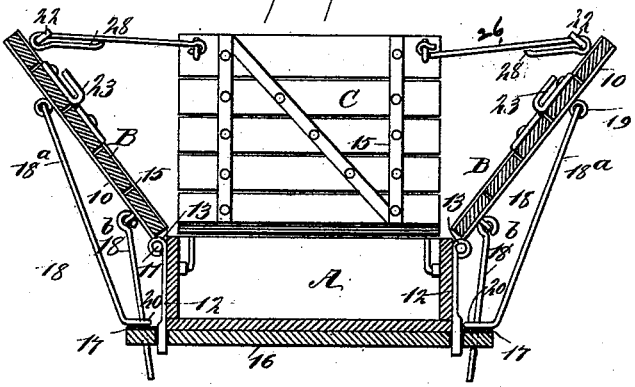
Figure 3:
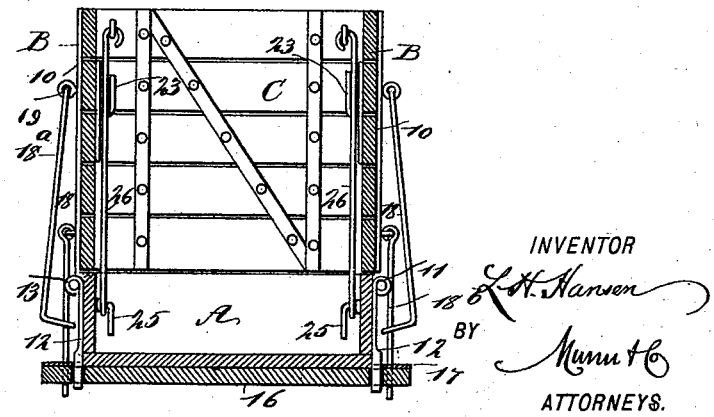

Figure 1 is a partial side elevation and partial vertical section of a vehicle having the improvement applied thereto. Fig. 2 is a transverse section taken at about the center of Fig. 4, illustrating the body extension in position as a hay carrier. Fig. 3 is a transverse section through the body extension in closed condition said section being taken practically on the line 3—3 of Fig. 1. Fig. 4 is a plan view of the vehicle having the attachment applied, the attachment being in position as a hay carrier; and Fig. 5 is a detail view of a portion of the body.

The body A of the vehicle illustrated, represents the body of an ordinary farm wagon, comprising sides and ends of moderate height, and a bottom, the whole body being mounted upon the ordinary running gear. The body extension, top box or rack, constituting the feature of the invention, comprises two side sections B and two end sections C. Each section is independent of the other, and the sections may be made, as shown in the drawings, of a series of slats secured together by battens or otherwise, or the sections may be made solid, or they may be made more open than illustrated in the drawings.

When the sections are made of slats, which construction is preferred owing to its lightness and its special adaptability as a hay carrier, the slats are usually connected by straps 10, located transversely of the sections and extending from top to bottom, crossing all of the slats. The straps 10, are located one at or near each end of a section, and any required number are placed intermediate of the end ones. Each strap, when they are used, is made to terminate at its lower end in a horizontal pintle 11, the pintle being below the plane of the lower edge of the sections, and the pintle and strap are adapted to constitute one member of a hinge, whereby the sections are to be attached to the wagon body. The other section of the hinge, comprises preferably a strap 12, secured to the outer side of the body and terminating at its upper end in an eye or knuckle 13, adapted to receive the pintle of the hinge section above it. Although this form of hinge is preferred I desire it to be understood that any other equivalent hinge may be substituted therefor.

When the strap hinge illustrated is used, it is secured to the slats of the sections by passing rivets 14, through the straps, through the slats, and through a second series of straps 15, located upon the inner faces of the sections. Thus it will be observed that separate washers for each rivet is dispensed with, and the parallel straps upon the outer and inner faces of the sections serve materially to strengthen them.

Ordinarily the hinges are so placed that the lower members of the hinges will project through the projecting ends of the bottom beams 16 of the wagon body, and the outer surfaces of the said beams 16, adjacent to the body are provided with metal plates 17, secured thereon in any suitable or convenient manner, the plates being adapted as wear plates.

Each section is provided with two or more sliding braces 18, and the said braces each comprise two sections, an upper long section $18^a$ and a lower shorter section $18^b$. The sections or members of the sliding braces are made of stout wire, round or polygonal bar iron, as in practice may be found most advantageous and desirable. The upper and longer section or member of each sliding brace is pivotally connected to an eye 19, which is preferably located upon the upper hinged section between the center and top; and the said upper sections $18^a$ of the sliding braces are of sufficient length to extend downward some distance below the center of the wagon body when the extension sections are in a vertical or closed position, as shown in Figs. 1 and 3, and the upper sections of the braces each terminate at the lower end in a loop 20, horizontally located. The lower section $18^b$ of each brace, is pivotally connected with an upper hinged section B, of the body extension, near the lower end, as is likewise shown in Figs. 1 and 3, and the said lower brace section is passed loosely through the loop or eye 20 in the upper section of the brace, and is then made to loosely enter an aperture produced in one of the wear plates 17, and in the body beam to which the plate is attached. Thus one section of a brace has guided movement upon the other, and the other section is stayed at its opposite end in a fixed support, yet is readily removable therefrom. When the sections of the body extension are folded out to form a straw carrier, the eyes of the upper brace sections will rest upon the wear plates 17, or practically so.

In order to facilitate the mounting of the side extensions on the sides of the wagon body, the wagon body upon each side near each end is provided with a stirrup 21, as shown best in Fig. 5, and by placing a pintle of an upper section of one end hinge in one of the stirrups, said stirrup will support the side section, enabling the operator to pass to the opposite end of the section and guide the pintle at that end to its knuckle, and by moving the side section bodily, all of the pintles may be made to enter their respective knuckles and the hinged connection will be complete.

Each side section at its upper edge near the end is provided upon its inner face with a pin 22, and each side section near each upper corner is provided upon its inner face with a hook-like keeper 23, diagonally placed upon the section and having sliding movement thereon, as shown in Fig. 4. These keepers may be made in various ways; in the drawings they are represented as being made of stout wire, comprising a hook and slotted shank, the hook emanating from about the central portion of the shank. Corresponding sliding keepers 24, are located upon the inner faces of the sides of the body near each end; or as shown in Fig. 4, instead of sliding keepers 24, keepers 25, may be substituted, having rotary movement in the body, the latter keepers consisting of a button of angular shape, mounted to turn in suitable bearings secured to the sides of the body. The latter form of keepers is illustrated at one end of the body in Fig. 4, while the form heretofore referred to is illustrated at the opposite end of the body in the same figure. Either or any form of keepers may be used in the same structure.

Both the front and end gates or sections of the attachment, are provided with latch rods 26, pivotally connected with the inner faces of the sections or gates at each upper corner; and the free ends of the latch rods are provided either with a hook 27, adapted to engage with the body keepers 24, or with loops 28, when the rotary keepers 25, are used.

The sections are firmly bound together in their closed or upright position by causing the latch rods to engage with the hooks 23 of the side section keepers, and then engage with the body keepers 24 or 25, whichever are employed, all of the keepers being shifted so as to secure their binding engagement with the latches.

When it is desired to use the body for carrying hay, straw and the like, the latches are disengaged from the keepers, and the sections are folded out as shown in Figs. 2 and 4, at an angle to the body of the vehicle, one brace section sliding upon the other; and the latches are then made to engage with the pins 22 of the side sections, whereby the latches will cross the space intervening the sections at their ends, and all of the sections will be firmly held at the same angle to the body.

I desire it to be distinctly understood that the latches may be placed upon the side sections, and the keepers upon the end sections or gates, if occasion may demand, or the body may be made a close structure instead of a slatted one as illustrated.

Having thus described my invention, I claim as new, and desire to secure by Letters Patent—

1. The combination with a wagon body of front rear and side extensions having hinged and removable connection with the body, keepers located upon the body, latches carried by the extension sections and adapted for engagement with the keepers and sliding braces carried by each of said sections and having removable connection with the body, each brace comprising two members secured at their upper ends to the extension sections, the free end of one of said members being adapted to engage loosely with a fixed part of the body frame and the other member having a sliding movement upon the first member, as and for the purpose specified.

2. The combination with a wagon body, keepers located upon the body and hinge members likewise secured to the body, of extension end and side sections provided with hinge members adapted for engagement with those of the body, braces connected with the extension sections and comprising a pendent member having its free end held loosely in a fixed support and a second member having sliding movement upon the pendent one, keepers carried by sundry of the extension sections, and latches connected with other extension sections and adapted for engagement with the keepers of the extension sections and the keepers of the body, as and for the purpose set forth.

3. The combination, with a wagon body, provided with keepers and sections of hinges, of extension sections provided with attached hinge sections adapted for removable engagement with those of the body, latches carried by the extension sections and adapted for engagement with the body keepers, sliding braces carried by the extension sections and having removable and sliding engagement with the body, and stirrups secured to the wagon body for supporting the sections and guiding their hinged members to an engagement with the corresponding members of the body, as and for the purpose specified.

4. As an improved article of manufacture an extension box or rack for wagons, the same consisting of side and end sections, each section being provided with a member of a hinge secured thereto, braces likewise secured to the sections, each brace comprising a pendent member having its upper end pivotally connected to the section and a second member likewise pivotally connected to the section and having a sliding movement upon the pendent member, keepers located upon one set of the sections, and latches carried by the other set, the latches and keepers being adapted to be brought into engagement substantially as shown and described.

5. A top box or rack extension for wagons, the same consisting of side and end sections, each section having a member of a hinge secured thereto, braces attached to each section comprising a pendent member having its upper end pivotally connected to the section and a second member having its upper end likewise pivotally connected to the section and having a sliding movement upon the pendent member, keepers secured to one set of the sections upon their inner faces and pins carried by the same set near their upper corners, and latches connected with the other set of the sections, the said latches being adapted for engagement with the keepers on the sections when said sections are closed and for engagement with the pins when the sections are opened as and for the purpose specified.

6. The combination with a wagon body of extension end and side sections having hinged connections therewith, and braces for each of said sections, each brace comprising two members secured at their upper ends to the section, one of the members having a loop at its lower end adapted to rest upon the body beam when the section is extended, and the end of the other member arranged to pass loosely through the loop of the first member and through an aperture in the body beam, as and for the purpose set forth.

LAWRENCE H. HANSEN.

Witnesses:
   J. P. MORTENSON,
   N. M. HANSEN.